United States Patent [19]
Hickman, Jr.

[11] Patent Number: 5,626,457
[45] Date of Patent: May 6, 1997

[54] GRAPPLE IMPACTOR

[75] Inventor: Halbert I. Hickman, Jr., Alabaster, Ala.

[73] Assignee: Action Machinery Company of Alabama, Inc., Helena, Ala.

[21] Appl. No.: 560,833

[22] Filed: Nov. 20, 1995

[51] Int. Cl.$^6$ ........................................................ E02F 3/96
[52] U.S. Cl. ........................ 414/739; 414/912; 414/704; 173/185
[58] Field of Search ........................ 414/680, 704, 414/729, 739, 912; 37/406; 173/184, 185, 46

[56] References Cited

U.S. PATENT DOCUMENTS

| | | |
|---|---|---|
| 3,319,724 | 5/1967 | Cunningham . |
| 3,586,113 | 6/1971 | Grant ........................................ 173/46 |
| 3,915,501 | 10/1975 | Cobb et al. ............................ 414/912 |
| 4,070,772 | 1/1978 | Motomura et al. . |
| 4,444,542 | 4/1984 | Shaw et al. . |
| 4,466,494 | 8/1984 | Hanson . |
| 4,602,821 | 7/1986 | Schaeff . |
| 4,719,975 | 1/1988 | LaBounty . |
| 5,407,017 | 4/1995 | Wehr et al. . |

FOREIGN PATENT DOCUMENTS

| | | | |
|---|---|---|---|
| 1406315 | 6/1988 | U.S.S.R. | ...................... 37/406 |

OTHER PUBLICATIONS

Translation of SU 1406315, 6 pages test, original date of Jun. 30, 1988.

Marketing brochure, Technical & Alloy Corp., Jun. 15, 1995, 8 pages.

Marketing brochure, Action Machinery Co., Action Model No. 1060 IM, Impactor, 2 pages.

Marketing brochure, Action Machinery Co., Manipulators and Severe Duty Robots, 6 pages.

*Primary Examiner*—Karen B. Merritt
*Assistant Examiner*—Gregory A. Morse
*Attorney, Agent, or Firm*—Veal & Associates

[57] ABSTRACT

An improved robotic power grapple having the capability to both manipulate and impact objects. The grapple has a head assembly containing pivotal jaws and an impact hammer disposed within a rotation device to allow the head assembly and jaws to rotate about a central axis. An impact rod extends through the rotation device and through an opening in the tips of the jaws to permit impaction of objects proximate the opening. In combination with an articulated boom and orientation device, the improved grapple may be utilized in severe-duty foundry operations to remove gates and risers from foundry castings.

41 Claims, 5 Drawing Sheets

GRAPPLE IMPACTOR

FIELD OF THE INVENTION

The present invention relates to material handling equipment, and more particularly to material handling equipment adapted for manipulating and hammering objects through the use of a robot type manipulator. In greater particularity the invention relates to severe-duty robots for grappling and manipulating objects in a heavy industry environment. In even greater particularity, the invention relates to impactor devices on the heavy duty manipulators for impacting gates and risers on cast objects in a foundry environment and thereby severing the same. Furthermore, the grapple invention incorporates the impactor within the manipulator so that the impactor's hammer rod extends through the robot manipulator's jaws to provide a gate or riser removal apparatus.

BACKGROUND OF THE INVENTION

The foundry industry utilizes robot manipulators in hazardous environments. Robots and robotic arms or manipulators, sometimes called articulated booms, must withstand heat, dust, vibration, and general battering of heavy industry when working in foundry environments. Due to these severe duty requirements, manipulator designs currently internalize hydraulic lines, avoid using telescoping joints, operate at higher speeds, manipulate in a large work envelope, and incorporate customized computer hardware and software to accommodate complex repetitive motions. Typically, robot manipulators are controlled from either a downloaded program initiated from a console, or through manual control via a joystick. Severe-duty manipulators incorporate various types of articulated booms to accommodate a wide range of objects. A manipulator may have a single large arm, or several highly mobile segmented arms to expand the field of operation. Robot manipulators may sometimes move objects weighing several tons, and thus incorporate high pressure hydraulic control systems. Articulated booms incorporate various types of grapples at the end or their arms to accommodate different tasks. A grapple may have a single pair of cooperative jaws, or several pair, or an odd number of jaws. In addition, jaws may be pressure sensitive, have teeth for gripping, or have shear cutting edges.

Foundry operations also utilize heavy duty impactors, sometimes referred to as knock-off hammers or thumpers. In the manufacture of iron castings, such as ductile iron castings, large iron risers are attached to critical areas of the molds to compensate for casting shrinkage during cooling. Remnant risen or gates can be removed manually with a sledge hammer, however many blows may be required to remove the gates at a high level of danger to a worker. In addition, worker training and protection is required in the manual gate removal strategy, thus making the use of labor intensive manual clean-up and de-gating of foundry castings a costly operation. The foundry industry has responded by utilizing pneumatic impactors or hammers to de-gate castings. The industry has also equipped grapples with metal shear type jaws to cut gates off castings during clean-up and sorting.

Some foundry manipulators have knock-off hammers at the end of their booms in place of a grapple. The articulated boom enables an operator to quickly manipulate the hammer into position to break-off a gate. These manipulator knock-off hammers often are used to move foundry castings into position by prodding or pushing castings. However, the Knock-off manipulators are not optimized for moving objects and are inadequate for sorting of castings after clean-up. Sighting indicia are usually provided on the impact tip where the impact rod extends out of the hammer housing to facilitate hammer aiming. An example of such a casting knock-off machine is the Action Impactor model #1060 IM, manufactured by Action Machinery Co. of Helena, Ala., USA. The model 1060 has a highly mobile boom and orientation joints to quickly move into an optimal position to knock-off a casting riser, including sighting indicia to facilitate aiming.

After a knock-off hammer de-gates a foundry casting, typically another type of manipulator will then be used to sort and move foundry pieces to a desired location. Severe duty manipulators, such as Action Manipulator model #960, manufactured by Action Machinery Co., have adaptable grapples and rapid response movement to quickly grasp and move foundry castings. Knock-off manipulators are not equipped to sort and manipulate objects and are therefore of limited specific use. Conversely, robot manipulators are not equipped to de-gate castings. Therefore, there is a great need in the industry for a robotic manipulator with a grapple that can both de-gate a casting using an impact hammer, and rapidly manipulate the de-gated casting into a desired area.

SUMMARY OF THE INVENTION

It is the object of the present invention to provide a material handling device utilizing an articulated boom and grapple that can grip objects and rapidly move them to a desired area.

Another object of the present invention is to provide an impact hammer for removing gates or risers from foundry castings during a clean-up operation.

Still another object of the invention is to provide a power grapple attached to the end of an articulated boom containing an impact hammer for de-gating casting risers and then sorting and rapidly moving the casting articles to a desired area.

Yet another object of the current invention is to provide an impact hammer disposed within a power grapple having an orientation means interposed between the grapple and an articulated boom for de-gating casting risers.

Another object of the invention is to provide a sighting reference along the jaws of the grapple to facilitate impact hammer aiming.

Still yet another object of the present invention is to provide an articulated boom having a power grapple at an end that can grasp objects and impact them with an impact hammer while contained within the jaws of the grapple.

Yet another object of the invention is to provide an articulated boom and power grapple with impact hammer that has a cushioning cylinder on the boom to regulate impact recoil upon hammer rod extension.

Yet another object of the invention is to provide a power grapple and impact hammer apparatus with shearing jaws for cutting and knocking-off of casting risers and gates.

Other features and objects and advantages of the present invention will become apparent from a reading of the following description as well as a study of the appended drawings.

The apparatus may be briefly described as a power grapple attached to an articulated boom. An orientation means is interposed between the grapple and the boom to allow pitch and yaw motion, and the grapple has a pair of gripping jaws mounted on a rotation means to allow 360° jaw rotation thereby giving the grapple full and precise positioning capability. A pneumatic impact hammer is disposed within the rotation means, and an impact rod of the hammer extends through and between the clamping jaws. The jaws allow extension of the impact rod when the jaws are in a closed position along the central axis. The jaw tips have a semi-circular shape to form an opening at the tip of the grapple when the jaws are closed from which the impact rod extends to impact objects. The shape of the grapple in combination with the jaw tips allow an operator to quickly align a targeted object with the opening prior to rod actuation. The recoil shock of impacting a casting article is regulated with a shock absorbing cylinder attached to the orientation means and the boom.

BRIEF DESCRIPTION OF THE DRAWINGS

Apparatus embodying features of my invention are illustrated in the enclosed drawings which form a portion of this disclosure and wherein.

DESCRIPTION OF THE PREFERRED EMBODIMENT

Figures 1, 1A:
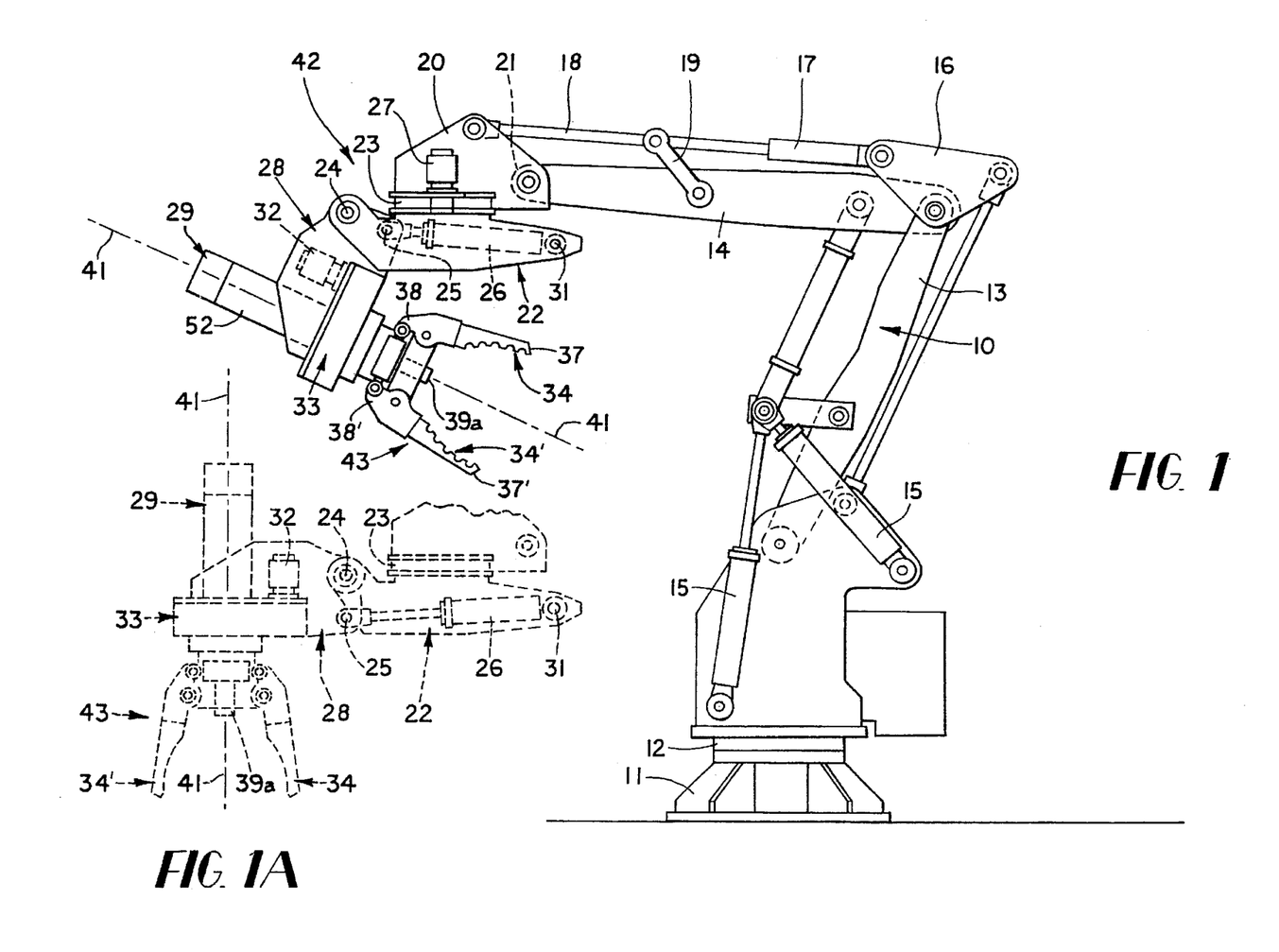
FIG. 1 is an elevational view showing the entire apparatus.
FIG. 1A is an elevational view of the grapple and orientation means with the pitch actuator extended to show pitch adjustment.

Referring to the drawings for better understanding of the principles of operation and structure of the invention, it will be seen that FIG. 1 shows an overall layout of the apparatus containing the grapple-impactor invention. Articulated boom 10 is supported by base 11 that includes a turntable 12 for rotation of the boom in 360 degrees. Boom 10 includes a larger first elongated arm 13 and a second elongated arm 14 attached to the first arm 13 through a boom articulation joint 16. Arm 14 includes a free end 21 distal the articulation joint 16, and boom arm 14 supports an attachment head 20 which is attached to the free end 21. The attachment head 20 is also connected to the boom articulation joint 16 through a shock control cylinder 17 and an extension member 18 in coaxial linear alignment. The extension 18 and shock control cylinder 17 are supported in parallel alignment to boom arm 14 with parallelogram linking members 19. Linear actuation means 15 provides power movement to the boom arms as is well known in the art.

Figure 2:
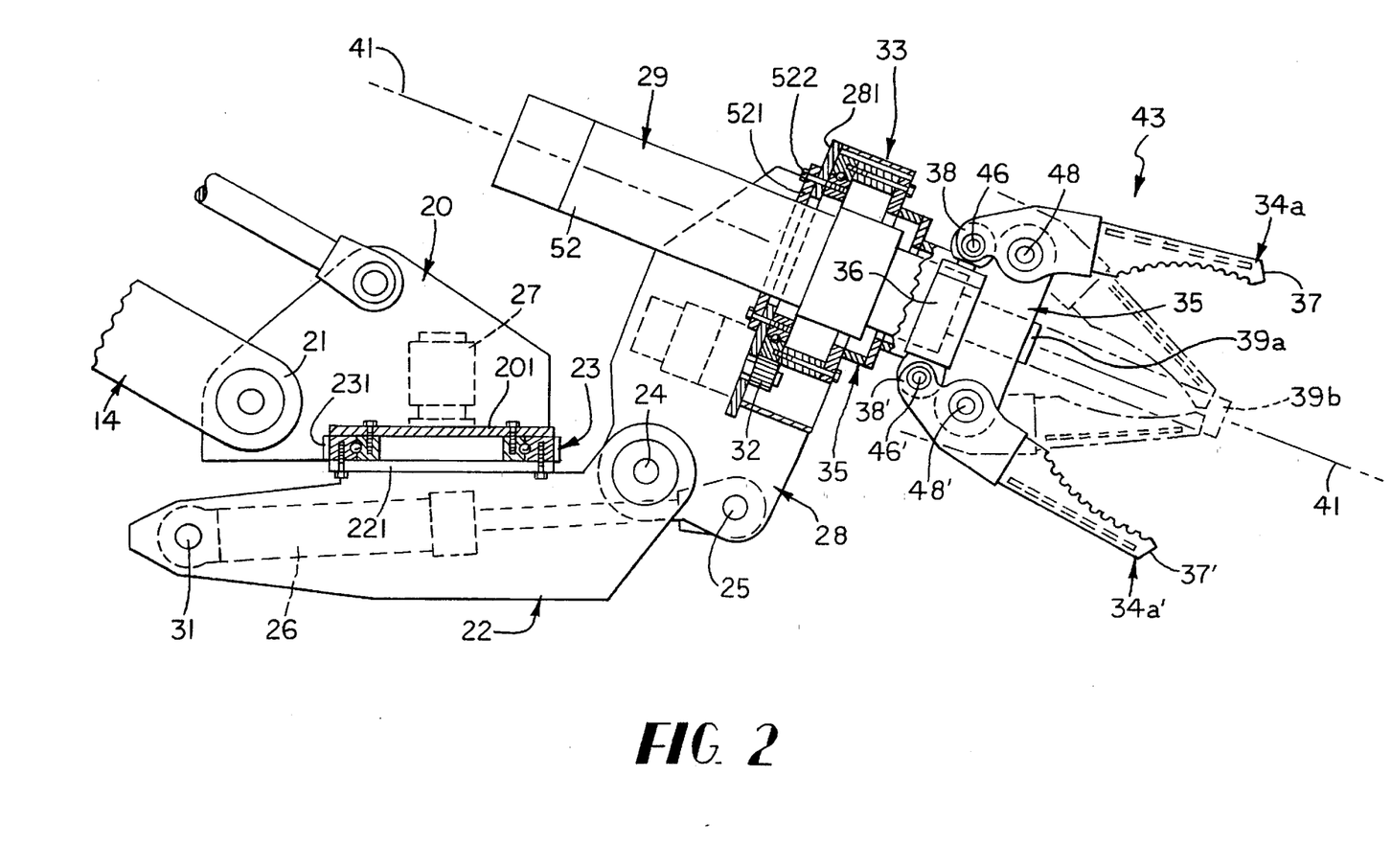
FIG. 2 is an elevational view of the grapple and orientation means mounted on the boom end with grapple jaws in closed and open positions.

Referring to FIG. 2, mounted on the attachment head 20 of the boom is an orientation means 42 having a pitch body 22, a pitch actuator 26 connected to pitch body 22 at 31, and a pivot means 24. Orientation means 42 is pivotally mounted on the attachment head 20 via a rotatable mounting 23. Rotatable mounting 23 many be understood as a ring gear 231 and modified bearing captured between mounting plate 201 affixed to attachment head 20 and plate 221 affixed to pitch body 22, such that pitch body 22 is supported for concomitant rotation with ring gear 231. An actuator 27 which may be understood as a pinion gear driven by a hydraulic motor controls rotation of the ring gear 231 to control the yaw movement of the pitch body 22 relative to the attachment head 20. Grapple 43 has a pitch head 28 connected to pitch body 22 through pivot means 24. Pitch actuator 26 has one end connected to pitch head 28 at 25. As can be seen in FIG. 1A, pitch actuator 26 urges pitch head 28 around pivot means 24, thereby controlling grapple pitch orientation. Pitch head 28 supports impact hammer assembly 29, and a rotation mounting means 33. Rotation mounting means 33 may be understood as a ring gear and motor driven pinion 32 as herein above described, having a continuous aperture therethrough, and mounted to pitch head 28 and a grapple body assembly 35. Impact hammer assembly 29 is disposed within the rotation mounting means 33 so that impact rod 39 extends through the rotation mounting means 33, grapple body assembly 35, and a set of complimentary jaws 34 and 34', along a central axis 41. Jaws 34 and 34' are mounted on grapple body assembly 35 to allow 360 degree rotation of the jaws about the central axis. Pinion 32 is mounted on pivot head 28 to control rotation (roll) of the jaws about the central axis.

Figure 3:
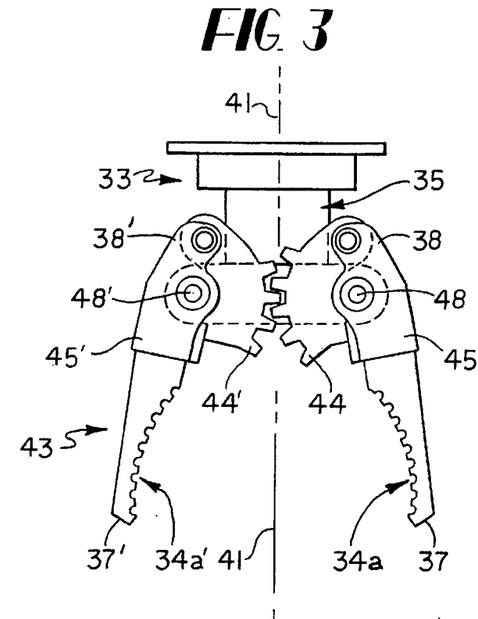
FIG. 3 is an elevational view of the jaw and jaw timing gears.
Figure 4:
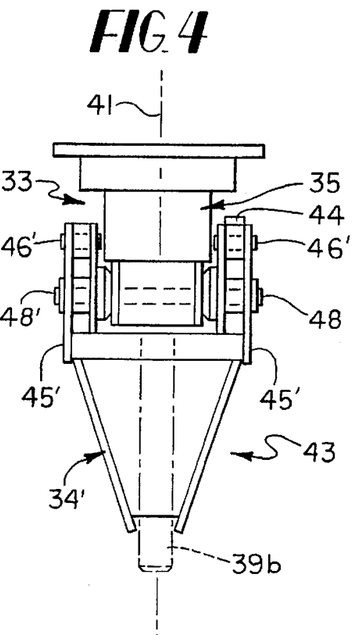
FIG. 4 is an elevational view of the jaw rotated 90 degrees from FIG. 3.
Figure 5:
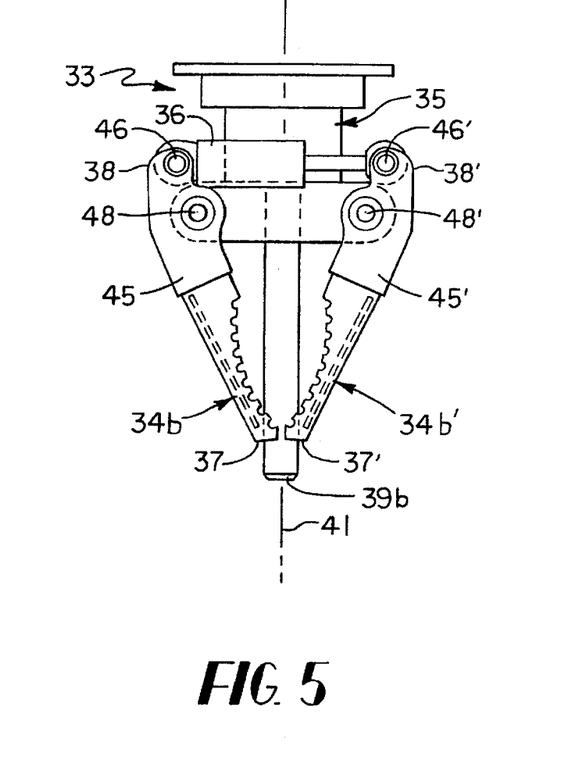
FIG. 5 is an elevational view of the jaw on an opposite side from FIG. 4.
Figure 6:
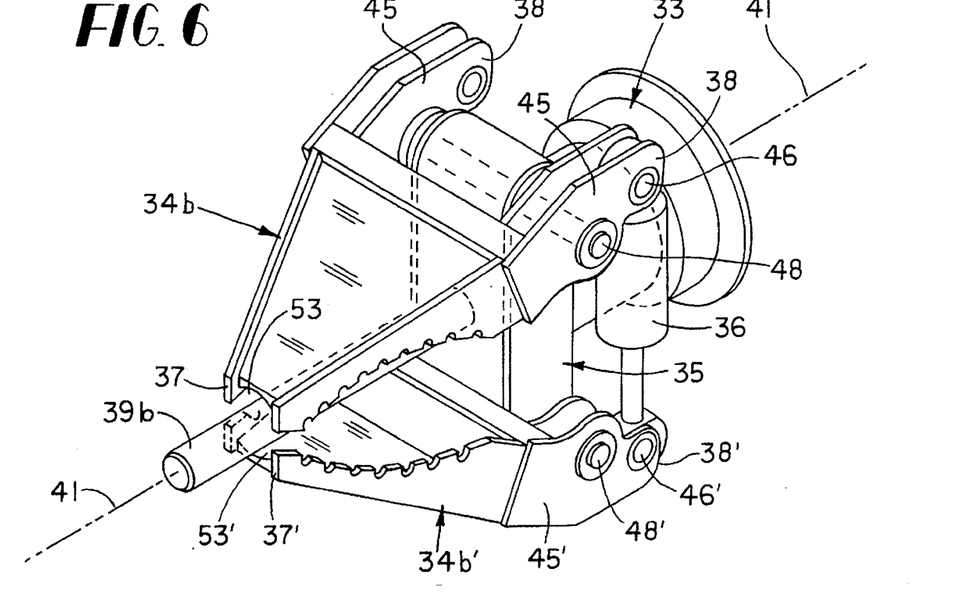
FIG. 6 is a perspective view of the jaw with the hammer rod extended.
Figure 7:
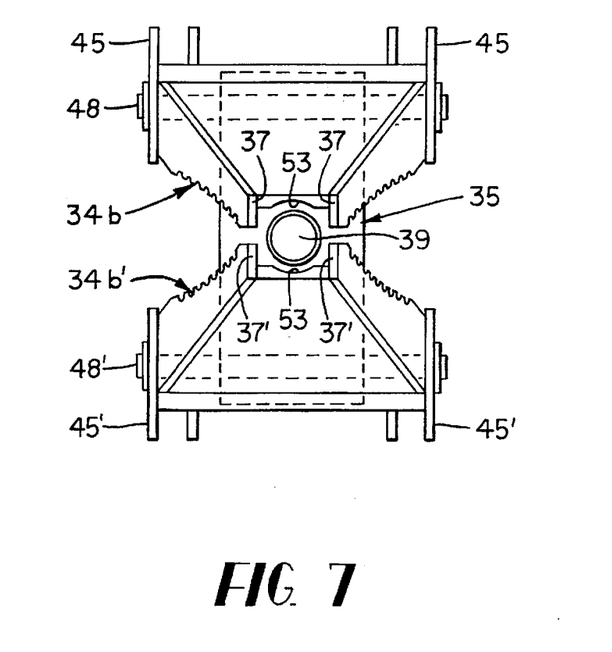
FIG. 7 is a front elevational view of jaws in a closed position.

As is best seen in FIGS. 3–5, Jaws 34 and 34' each include a pivot end 38, 38' and a jaw tip 37, 37'. Each jaw includes a weldment 45, 45' on the pivot end pivotally connected at 48, 48' to a grapple body assembly 35. A grapple actuation means such as a linear actuator 36 is connected between each respective weldment 45, 45' at 46, 46' and in combination with the pivotal connection 48, 48' allows the jaws to pivot to an open (34a) or a closed position (34b) in response to the grapple actuation means, and thereby also allowing free rotation about axis 41 while opening and closing. Actuator 36 is offset from axis 41 such that it does not interfere with the impact hammer. FIG. 3 shows that each jaw includes a timing gear 44, 44' fixed to the weldment 45, 45' which cooperatively mesh to maintain the jaws in an equal relation with respect to the axis 41 when closing and opening.

Figure 8:
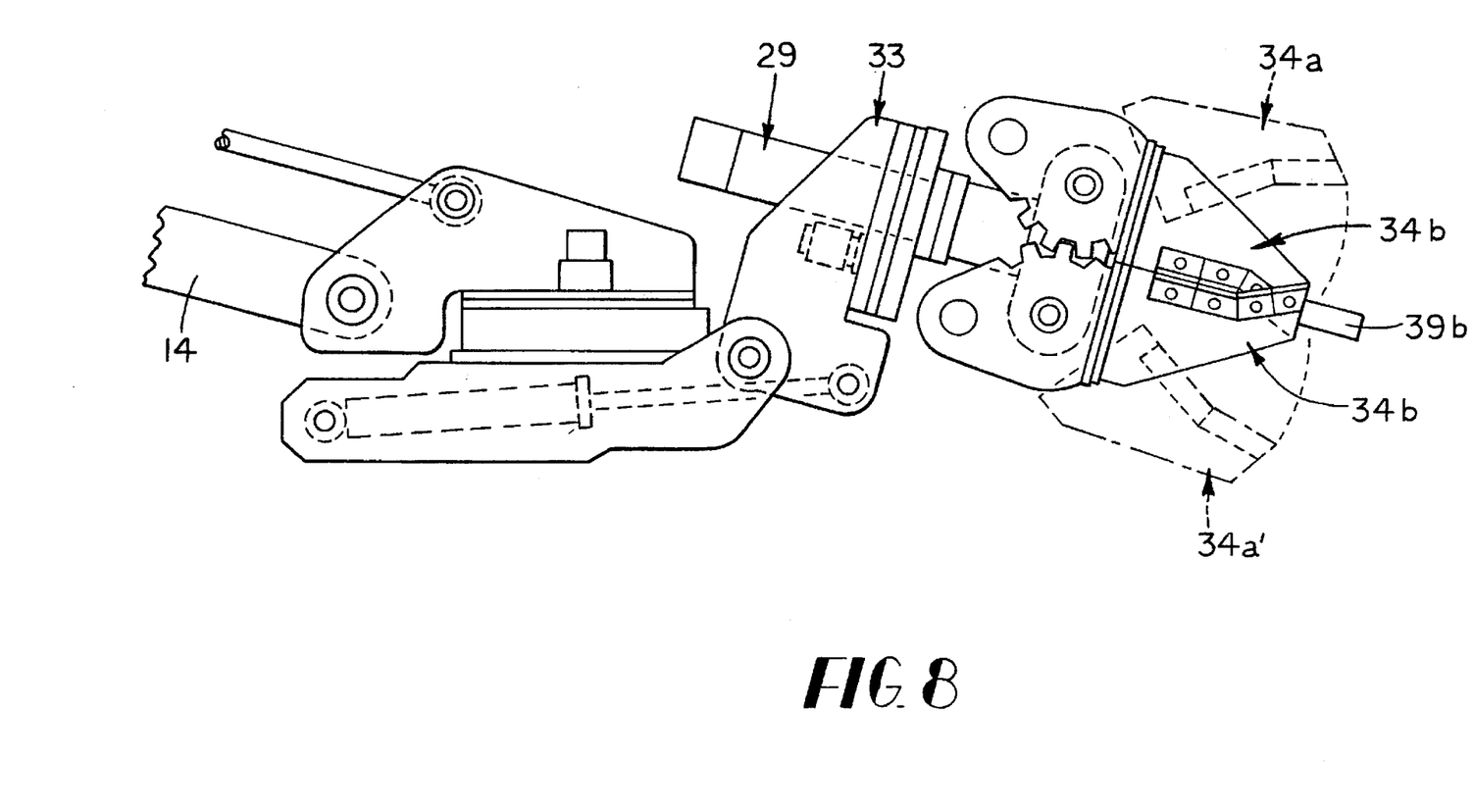
FIG. 8 is an elevational view of shear type grapple impactor in a closed position.

Referring again to FIG. 2, the Impact hammer assembly 29, includes a cylindrical housing 52 which is mounted to plate 281 affixed to the pitch head 28 by flange 521 and bolts 522. The appropriate hydraulic circuit is connected to extend impact rod 39 through rotation mounting means 33 and grapple body assembly 35 without interfering with the rotation of the jaws. In a retracted position 39a, the rod will not interfere with the grasping and manipulating of objects by the jaws. The rod extends partially beyond the jaw tips 37, 37' to a position 39b through an opening 53 formed by the cooperative structure of each jaw tip 37, 37' (see FIG. 7). The opening 53 allows the impact rod 39 to impact objects when the jaws are in a closed position 34b. While clamping jaws are shown in FIGS. 1–7, shearing type jaws may be substituted while also allowing rod extension beyond the shearing jaw tips as shown in FIG. 8.

In a typical foundry operation, an operator positions the grapple by maneuvering the boom 10 and orientation means 42 as is well known in the industry. The operator then can rotate the jaws using the rotational mounting means 33 and open the jaws using the grapple actuator 36. A cast object can then be grasped within the jaws and moved as just stated to a desired area and released. Once the object is released, the operator can close the jaws and use the jaw tips and channel opening to aim the impact rod to a desired contact point. In a de-gating procedure, the operator aims the rod to contact the casting gate thereby removing the gate upon impaction. After extension, the rod automatically retracts to position 39a, and the operator can use the grapple as a manipulator to sort castings to a desired area.

It will be appreciated to those familiar with the art that the impactor grapple replaces two individual robotic machines doing the same de-gating task, yet will operate within the same severe-duty foundry environment. It will also be appreciated that the invention can be utilized in mining, demolition, scrap handling, and similar work.

While it has been shown that the invention works in one form, it will be obvious to those skilled in the art that it is not so limited but is susceptible to various changes and modifications without departing from the spirit thereof.

Having set forth the nature of the present invention, what is claimed is:

1. In combination with a base and an articulated boom having one end attached to said base and a free end, an apparatus for grappling, manipulating, and impacting objects, comprising:

a) a grapple having a central axis;
   b) orientation means interposed between said grapple and said free end for orienting said axis relative to said boom;
   c) an impact hammer disposed within said grapple for impacting objects along said axis proximate and external of said grapple; and
   d) grapple actuation means for actuating said grapple for selective movement to an open position and a closed position relative to said axis.

2. An apparatus for grappling, manipulating, and impacting objects as recited in claim 1, wherein said grapple comprises:

a) a pitch head pivotally mounted to said orientation means;
   b) a pair of opposed jaws for engaging objects therebetween; and
   c) rotation mounting means attached to said frame for mounting said jaws on said frame for rotation about said central axis, and wherein said impact hammer impacts said objects when said pair of opposed jaws is in said closed position.

3. An apparatus for grappling, manipulating, and impacting objects as recited in claim 2, wherein said orientation means comprises:

a) a pitch body rotatably mounted on an attachment head of said boom; and
   b) pivot means mounted on said pitch body, said pitch head attached to said pivot means for pivotal movement of said central axis relative to said pitch body.

4. An apparatus for grappling, manipulating, and impacting objects as recited in claim 3, said impact hammer comprising:

a) a housing mounted on said pitch head;
   b) an impactor rod slidably mounted within said housing and extending therefrom; and
   c) impact extension means for forcefully extending said rod from said housing along said axis to impact objects.

5. An apparatus for grappling, manipulating, and impacting objects as recited in claim 4, wherein said jaws further include cooperatively spaced jaw tips distal said rotation mounting means adapted to cooperatively form an opening along said axis to allow passage of said impactor rod therethrough upon extension thereof such that said objects are impacted by said rod at a point beyond reach of said tips.

6. An apparatus for grappling, manipulating, and impacting objects as recited in claim 5, wherein said jaws are shear type jaws.

7. An apparatus for grappling, manipulating, and impacting objects as recited in claim 6, wherein each jaw of said pair has a pivot end opposite said tips, each said jaw being pivotally mounted intermediate said end and said tip on a grapple body assembly mounted on said rotation mounting means for pivotal rotation about said central axis, each jaw of said pair including a corresponding timing gear positioned proximate said pivot end, said corresponding gears adapted to cooperatively mesh to maintain said jaws in equal relation to said axis, said grapple actuation means mounted between each said pivot end lateral of said axis for pivoting said jaw tips into said closed and open positions.

8. An apparatus for grappling, manipulating, and impacting objects as recited in claim 7, wherein said grapple actuation means comprises at least one linear actuator.

9. An apparatus for grappling, manipulating, and impacting objects as recited in claim 4, wherein said jaws are shear type jaws.

10. An apparatus for grappling, manipulating, and impacting objects as recited in claim 4, wherein each jaw of said pair having a tip and an opposite pivot end, each said jaw being pivotally mounted intermediate said end and said tip on a grapple body assembly mounted on said rotation mounting means for pivotal rotation about said central axis, each jaw of said pair including a corresponding timing gear positioned proximate said pivot end, said corresponding gears adapted to cooperatively mesh to maintain said jaws in equal relation to said axis, said grapple actuation means mounted between each said pivot end lateral of said axis for pivoting said jaw tips into said closed and open positions.

11. An apparatus for grappling, manipulating, and impacting objects as recited in claim 10, wherein said grapple actuation means comprises at least one linear actuator.

12. An apparatus for grappling, manipulating, and impacting objects as recited in claim 3, wherein said jaws are shear type jaws.

13. An apparatus for grappling, manipulating, and impacting objects as recited in claim 2, wherein each jaw of said pair having a tip and an opposite pivot end, each said jaw being pivotally mounted intermediate said end and said tip on a grapple body assembly mounted on said rotation mounting means for pivotal rotation about said central axis, each jaw of said pair including a corresponding timing gear positioned proximate said pivot end, said corresponding gears adapted to cooperatively mesh to maintain said jaws in equal relation to said axis, said grapple actuation means mounted between each said pivot end lateral of said axis for pivoting said jaw tips into said closed and open positions.

14. An apparatus for grappling, manipulating, and impacting objects as recited in claim 13, wherein said grapple actuation means comprises at least one linear actuator.

15. An apparatus for grappling, manipulating, and impacting objects as recited in claim 14, wherein said jaws are shear type jaws.

16. An apparatus for grappling, manipulating, and impacting objects as recited in claim 2, said impact hammer comprising:

a) a housing mounted on said pitch head;
   b) an impactor rod slidably mounted within said housing and extending therefrom; and
   c) impact extension means for forcefully extending said rod from said housing along said axis to impact objects.

17. An apparatus for grappling, manipulating, and impacting objects as recited in claim 16, wherein said jaws further include cooperatively spaced jaw tips distal said rotation mounting means adapted to cooperatively form an opening along said axis for allowing passage of said impactor rod therethrough upon extension thereof.

18. An apparatus for grappling, manipulating, and impacting objects as recited in claim 2, wherein said jaws further include cooperatively spaced jaw tips distal said rotation mounting means adapted to cooperatively form an opening along said axis for allowing passage of said impactor rod therethrough upon extension thereof.

19. An apparatus for grappling, manipulating, and impacting objects as recited in claim 18, wherein each jaw of said pair has a pivot end opposite said tips, each said jaw being pivotally mounted intermediate said end and said tip on a grapple body assembly mounted on said rotation mounting means for pivotal rotation about said central axis, each jaw of said pair including a corresponding timing gear positioned proximate said pivot end, said corresponding gears adapted to cooperatively mesh to maintain said jaws in equal relation to said axis, said grapple actuation means mounted between each said pivot end lateral of said axis for pivoting said jaw tips into said closed and open positions.

20. An apparatus for grappling, manipulating, and impacting objects as recited in claim 2, wherein said jaws further include cooperatively spaced jaw tips distal said rotation mounting means adapted to cooperatively form an opening along said axis for allowing passage of said impactor rod therethrough upon extension thereof, such that said objects are impacted by said rod at a point beyond reach of said tips.

21. An apparatus for grappling, manipulating, and impacting objects as recited in claim 20, said impact hammer comprising:
   a) a housing mounted on said pitch head;
   b) an impactor rod slidably mounted within said housing and extending therefrom; and
   c) impact extension means for forcefully extending said rod from said housing along said axis to impact objects.

22. An apparatus for grappling, manipulating, and impacting objects as recited in claim 2, wherein said impact hammer comprises a housing mounted on said pitch head, an impactor rod slidably mounted within said housing and extending therefrom, and impact extension means for forcefully extending said rod from said housing along said axis, said grapple further including jaws having jaw ends adapted to cooperatively form an opening along said axis for allowing passage of an impactor rod therethrough upon extension thereof.

23. An apparatus for grappling, manipulating, and impacting objects as recited in claim 1, said impact hammer comprising:
   a) a housing mounted on said grapple;
   b) an impactor rod slidably mounted within said housing and extending therefrom; and
   c) impact extension means for force fully extending said rod from said housing along said axis to impact objects.

24. An apparatus for grappling, manipulating, and impacting objects as recited in claim 23, wherein said grapple comprises:
   a) a pitch head pivotally mounted to said orientation means;
   b) a pair of opposed jaws for engaging objects therebetween; and
   c) rotation mounting means attached to said frame for mounting said jaws on said frame for rotation about said central axis.

25. An apparatus for grappling, manipulating, and impacting objects as recited in claim 24, wherein said impactor rod extends between said jaws.

26. An apparatus for grappling, manipulating, and impacting objects as recited in claim 25, wherein said jaws further include cooperatively spaced jaw tips distal said rotation mounting means adapted to cooperatively form an opening along said axis for allowing passage of said impactor rod therethrough upon extension thereof.

27. An apparatus for grappling, manipulating, and impacting objects as recited in claim 1, wherein said grapple further includes cooperatively spaced jaws adapted to pivot toward and away from said central axis, said jaws having an opening formed in jaw ends thereof.

28. An apparatus for grappling, manipulating, and impacting objects as recited in claim 27, wherein an impact rod extends between said jaws.

29. An apparatus for grappling, manipulating, and impacting objects, comprising:
   a) a base;
   b) an articulated boom having one end attached to said base, said boom including a shock control means for regulating shock compression resulting from recoil force of said impact hammer during impacting of said objects;
   c) a grapple having a central axis;
   d) orientation means interposed between said grapple and said boom distal said base for orienting said axis relative to said boom;
   e) an impact hammer disposed within said grapple for impacting objects along said axis proximate and external of said grapple; and
   f) grapple actuation means for actuating said grapple for selective movement to an open position and a closed position relative to said axis.

30. An apparatus as recited in claim 29, wherein said grapple comprises:
   a) a pitch head pivotally mounted to said orientation means;
   b) a pair of opposed jaws for engaging objects therebetween; and
   c) rotation mounting means attached to said frame for mounting said jaws on said frame for rotation about said central axis.

31. An apparatus as recited in claim 30, wherein said jaws further include cooperatively spaced jaw tips distal said rotation mounting means adapted to cooperatively form an opening along said axis for allowing passage of said impactor rod therethrough upon extension thereof.

32. An apparatus as recited in claim 31, wherein each jaw of said pair has a pivot end opposite said tip, each said jaw being pivotally mounted intermediate said end and said tip on a grapple body assembly mounted on said rotation mounting means for pivotal rotation about said central axis, each jaw of said pair including a corresponding timing gear positioned proximate said pivot end, said corresponding gears adapted to cooperatively mesh to maintain said jaws in equal relation to said axis, said grapple actuation means mounted between each said pivot end lateral of said axis for pivoting said jaw tips into said closed and open positions.

33. An apparatus as recited in claim 32, said shock control means comprising a resilient elongated assembly mounted to said boom by parallelogram linking members such that force transferred from said orientation means is abated in said resilient elongate assembly.

34. An apparatus as recited in claim 33 wherein said resilient elongated assembly comprises a bracket having a linear shock absorber integrally interposed within said bracket.

35. An apparatus as recited in claim 29, wherein said base includes a turntable for rotatably mounting said boom to said base.

36. An apparatus for grappling, manipulating, and impacting objects, comprising:

a) a base;

b) an articulated boom having one end attached to said base, said boom including a first elongated arm having a base end and an opposite end, said base end pivotally mounted to said base, a second elongated arm having a lower end and an upper end, a boom pivot means pivotally connecting said opposite end of said first arm to said lower end of said second arm, a shock control means for regulating shock compression resulting from recoil force of said impact hammer during impacting of said objects, and linear actuation means for controlling arm movement;

c) a grapple having a central axis;

d) orientation means interposed between said grapple and said boom distal said base for orienting said axis relative to said boom;

e) an impact hammer disposed within said grapple for impacting objects along said axis proximate and external of said grapple; and f) grapple actuation means for actuating said grapple for selective movement to an open position and a closed position relative to said axis.

37. An apparatus as recited in claim 36, said shock control means comprising a resilient elongated assembly mounted to said boom by parallelogram linking members such that force transferred from said orientation means is abated in said resilient elongate assembly.

38. An apparatus as recited in claim 37 wherein said resilient elongated assembly comprises a bracket having a linear shock absorber integrally interposed within said bracket.

39. An apparatus as recited in claim 38, wherein said grapple comprises:

a) a pitch head pivotally mounted to said orientation means;

b) a pair of opposed jaws for engaging objects therebetween; and c) rotation mounting means attached to said frame for mounting said jaws on said frame for rotation about said central axis.

40. An apparatus as recited in claim 39 wherein said jaws further include cooperatively spaced jaw tips distal said rotation mounting means adapted to cooperatively form an opening along said axis for allowing passage of said impactor rod therethrough upon extension thereof.

41. An apparatus as recited in claim 40, wherein each jaw of said pair has a pivot end opposite said tip, each said jaw being pivotally mounted intermediate said end and said tip on a grapple body assembly mounted on said rotation mounting means for pivotal rotation about said central axis, each jaw of said pair including a corresponding timing gear positioned proximate said pivot end, said corresponding gears adapted to cooperatively mesh to maintain said jaws in equal relation to said axis, said grapple actuation means mounted between each said pivot end lateral of said axis for pivoting said jaw tips into said closed and open positions.

* * * * *